H. F. SAUNDERS.
PROCESS OF PRODUCING OLEFINS.
APPLICATION FILED SEPT. 24, 1920.
1,393,249. Patented Oct. 11, 1921.
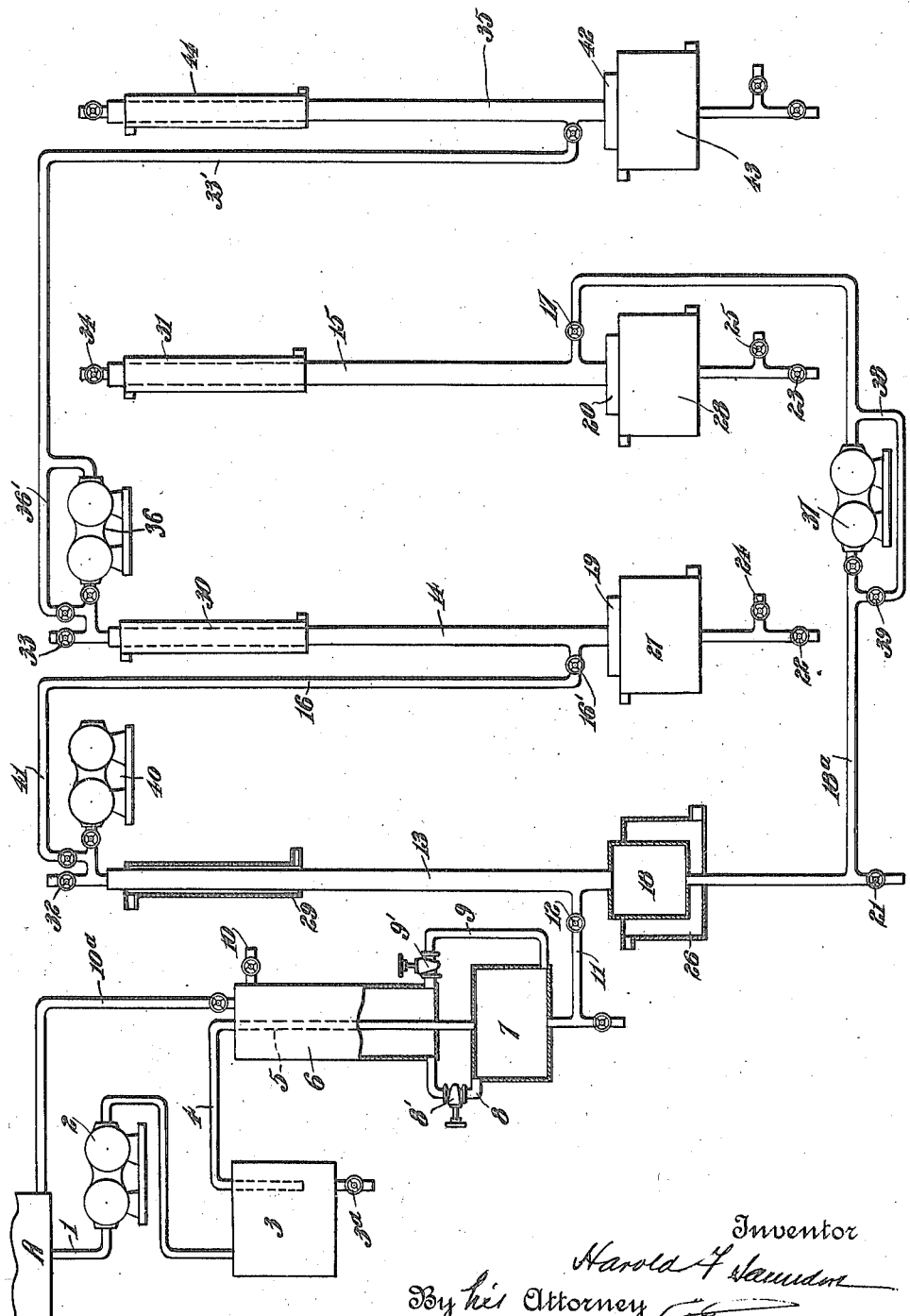

UNITED STATES PATENT OFFICE.

HAROLD F. SAUNDERS, OF BOUND BROOK, NEW JERSEY, ASSIGNOR TO THE GLYSYN CORPORATION, OF NEW YORK, N. Y., A CORPORATION OF NEW YORK.

PROCESS OF PRODUCING OLEFINS.

1,393,249.  Specification of Letters Patent.  Patented Oct. 11, 1921.

Application filed September 24, 1920. Serial No. 412,511.

*To all whom it may concern:*

Be it known that I, HAROLD F. SAUNDERS, a citizen of the United States, residing at Bound Brook, in the county of Somerset and State of New Jersey, have invented certain new and useful Improvements in Processes of Producing Olefins, of which the following is a specification.

My invention relates to a method of producing olefins of low boiling point such as propylene and ethylene in approximately pure state, or definite mixtures of such olefins with each other. My invention contemplates using as a raw material a crude hydrocarbon gas comprising a complex mixture of various ingredients such as the crude gas obtained by cracking or distilling either with or without the aid of a catalyst, hydrocarbon oils such as petroleum, gas oil, fuel oil, etc., or natural gas or the like. Such starting material will be hereafter referred to as "crude gas."

My present application is a continuation in part of my application "Process of producing olefins," Serial No. 379,318, filed May 6, 1920. In the said application is described a process in which the crude gas is compressed at a relatively high pressure so as to liquefy the paraffin oils, higher olefins and a portion of the propylene and ethylene contained in the crude gas. The uncondensed portion of the crude gas contains a proportion of propylene and ethylene which should be added to the liquid portion as far as is possible. I preferably accomplish this enrichment of the liquid by intimately mingling together the gaseous and liquid portions while subjecting the mixture to a strong cooling which results in greatly increasing the absorptive capacity of the liquid for the lower olefins.

The liquid thus formed is subsequently treated by pressure and temperature combinations in such a way as to separate out the desired product or products. This is preferably accomplished in a continuous process by passing the liquid referred to into a column or chamber which is maintained at a calculated pressure and in which a calculated temperature gradient is maintained by applying suitable heating or refrigerating agencies to the lower and upper ends of the same. By such means the liquid which is progressed into such vessel is constantly separated into a liquid portion at the bottom with a gaseous portion above the same. Under suitable conditions, the desired product such as propylene may be almost entirely contained in the gaseous portion which is then caused to pass into a similar vessel in which the application of suitable pressure and a suitable temperature gradient may result in the separation of substantially pure propylene.

My co-pending application refered to covers the process briefly described above more or less broadly and with especial reference to the form of the process just referred to, in which the gaseous portion which is separated from the liquid in the first vessel or column contains a large percentage of propylene or other desired olefin, which is then subjected to pressure and a suitable temperature gradient in a second column so as to separate propylene as a liquid, the remainder of the mass remaining in the gaseous condition.

In the present application I shall claim a modification of the above process, in which the pressure and temperature gradient in the first column are so regulated that a considerable proportion of the propylene will remain in the liquid portion of the mass. This liquid portion is then passed into a similar vessel in which the application of suitable pressure and a suitable temperature gradient results in the separation of the desired olefin, such as propylene in the gaseous form, the other elements of the mass remaining in liquid form.

In order that my invention may be more clearly understood, attention is hereby directed to the accompanying drawing forming part of this application and illustrating a form of apparatus by which my improved process may be carried out.

Referring to the drawing, in the production of pure propylene a liquid containing propylene with olefins of low boiling point in solution therein is first separated out of the crude gas under high compression and chilling. This may be accomplished as is described in my said application by continuously leading crude gas from a gas holder A, through the passage 1 to the compressor 2. The gas is forced by the compressor into chamber 3, where under the high compression employed, such for example as 100 atmospheres, a liquid is separated out. This liquid will consist essentially of paraffin oils, which hold in solution some of the higher olefins, such as butylene and amylene, together with a certain proportion of the propylene and ethylene. The uncondensed portion of the crude gas in chamber 3 consists of a large amount of permanent or inert gases occurring in the original crude gas, such as hydrogen, methane, ethane, nitrogen, etc., holding in suspension a certain quantity of ethylene and propylene.

The propylene and ethylene contained in the gas may be largely condensed to liquid form by suitable refrigeration and pressure. I have found that the absorption by the liquid fraction formed in chamber 3 of the propylene and ethylene suspended in the gas may very effectively be promoted by intermingling the gas and the liquid while cooling the same.

In carrying out this step of the process a pipe 4 may be provided leading from the lower portion of chamber 3 and continuing as a vertical tube 5 terminating at its lower end in a chamber 7. A jacket 6 surrounds the tube 5 and a passage 8 leads from the upper part of chamber 7 into the lower part of jacket 6, this passage being controlled by a valve 8'. A passage 9 also preferably is used extending from the lower portion of chamber 7 to the lower portion of jacket 6, this passage being controlled by valve 9'. Valves 8' and 9' are expansion valves. The highly condensed gas and liquid in chamber 3 is forced through pipe 4 and its vertical continuation 5 with a thorough intermingling of the same and a strong cooling effect of the mixture is produced as it passes downwardly through tube 5. This may be produced by the expansion of the gases in chamber 7 through valve 8' into the jacket 6 from which they may pass through the outlet 10. At the start of the operation the valve 9' may also be opened, allowing some of the liquid in the bottom of chamber 7 to expand through the valve into jacket 6 to aid in bringing the jacket quickly to a low temperature, after which the valve 9' may be closed and the expansion of the gas through valve 8' alone relied upon to produce the desired chilling of the mixture in tube 5. The temperature of the liquid passing through tube 5 being greatly lowered, while its pressure is maintained, its absorptive capacity for propylene and ethylene is materially increased. By chilling the liquid in contact with the inert and uncondensed gas in which the propylene and ethylene are suspended, the greater part of the propylene and ethylene in the gas are transferred to the liquid.

The gases escaping from outlet 10 consist chiefly of inert or permanent gases, such as methane, ethane, hydrogen, oxygen and nitrogen. When the valve 9' is opened in the preliminary cooling of the apparatus a considerable proportion of propylene and ethylene are carried therewith, and in such a case these gases may be returned from the outlet 10 to the orginal gas holder containing the crude gas before the same is supplied to compressor 2. When the valve 8' only is opened, the gas passing out at outlet 10 usually contains so little propylene that its recovery would hardly be practicable. The liquid in chamber 7 is allowed to pass through tube 11 controlled by valve 12 into column 13.

In the form of my invention which is specifically described in my co-pending application, as stated above, this column 13 may, for example, be maintained at a pressure of from 15 to 20 atmospheres. A chamber 18 is provided at the lower end of column 13, chamber 18 being surrounded by a jacket or coil or the like 26, while the upper end of column 13 is surrounded by a jacket 29. Heat applied to chamber 18, by passing steam or other heating medium through jacket 26 maintains a temperature in chamber 18 which may be approximately 80° C., while cold water running through jacket 29 maintains the top of the column at a temperature which may be about 10° C. Consequently there is maintained in column 13 a temperature gradient which, under the pressure conditions given, causes the separation of the liquid into two parts. One of these is a liquid which separates in chamber 18 and contains the paraffins and the higher olefins with a small proportion of the propylene. The other or gaseous portion which forms above the liquid, consists mainly of the greater proportion of the propylene and ethylene together with such methane, ethane and other inert gases as were originally held in the liquid and carried along therewith.

The liquid which separates out in chamber 18 may be drawn off through valve 21 and carried to any tank or vessel in which its pressure is again lowered to atmospheric. By thus lowering the pressure of this liquid, the propylene and a portion of the higher olefins contained therein are given off in gaseous form and may be returned to the original gas holder to be again introduced into the system, while the paraffin oils remaining as such may be withdrawn and discarded.

The gas which forms in column 13 above the liquid, and containing a high percentage of propylene together with ethylene and inert gases, is passed through passage 16 and valve 16' into column 14, which is similar in construction to the column 13. The same pressure is maintained in this column as in column 13 and a similar temperature gradient to that employed in column 13. The limits of temperature are, however, different from those in column 13 and may vary from approximately 0° C. at chamber 19, at the bottom of the column, to minus 70° C. at the top of the column. Other combinations of temperature and pressure may, of course, be used to give the same results, depending on the vapor tension of the propylene under pressure used. In the example given, approximately pure propylene separates in liquid form in chamber 19 and may be drawn off through valve 22, while the uncondensed gas passes out through valve 33 at the top of the column.

When the recovery of ethylene is desired, the process may be carried out in the same manner as just described with an additional step. The gases passing out of the top of column 14 may be drawn into a similar column 35. This column is maintained at a higher pressure, such as 100 atmospheres, which may be produced by passing the gas through a compressor 36 in its passage from column 13 to column 35. A temperature gradient is employed in column 35 such as would be sufficient at the pressure employed to separate the ethylene as a liquid from the bottom. A temperature of 40° C. at the bottom and minus 65° at the top are suitable.

As other examples of the method of recovering propylene when the same is to be separated in liquid form, the following may be briefly referred to:

The liquid from chamber 7 may be expanded through valve 12 into column 13 which is maintained at atmospheric pressure. With this pressure the required temperature gradient in column 13 would be provided by a temperature of approximately 10° C. at the bottom and minus 30° C. at the top. The liquid is thereby divided into a liquid portion and a gaseous portion above the same, which latter is then passed into column 14 without change of pressure, column 14 being given a suitable temperature gradient by cooling the bottom of the same to minus 30° C. and cooling the same at the top to minus 100° C. Pure propylene separates in liquid form in chamber 19 and may be drawn off through valve 22.

In another example, the liquid from chamber 7 may be passed into column 13, it being expanded to atmospheric pressure within this column. The column is subjected to a temperature of 0° C. at the bottom and minus 30° C. at the top. The gaseous portion which separates out above the liquid portion is then passed into column 14 without change in temperature but with its pressure increased up to from 10 to 20 atmospheres.

This increased pressure may be obtained by use of the compressor 40 which may be interposed in the path of gases passing from the upper end of column 13 to column 14. By this method also pure propylene will be obtained in liquid form in chamber 19.

The desired olefin of low boiling point may also be obtained, by a somewhat different proceeding in gaseous form, this being, as stated, the form of my invention which will be claimed herein. As an example of this method, the liquid from chamber 7 is passed through valve 12 into column 13 in which a pressure from 25 to 35 atmospheres may be provided together with a temperature gradient produced by a temperature of approximately 80° C. at the bottom and of about 10° C. at the top. In such a case a larger proportion of the propylene will remain in chamber 18 in solution in the liquid than in the first example.

If now this liquid in chamber 18 is drawn off from the bottom through pipe connection 18$^a$ and valve 17 into column 15, pure propylene may be separated out as a gas in the latter. Column 15 may be entirely similar to the other columns referred to, such as 13 and 14, being provided with a chamber 20 at the bottom for liquids, surrounded by a heating jacket 28, the upper end of the column being provided with a cooling jacket 31. The pressure to be maintained in column 15 may be the same or higher than that maintained in column 13 in this example, and a temperature gradient maintained by heating the bottom of the column constantly to a temperature of about 80° C., and cooling the top of the column to about 0° C. In this case a quite complete separation occurs and pure propylene is obtained as gas at valve 34 at the top of the column. The other constitutents of the material separate out as a liquid in chamber 20, and may be drawn off through valve 23 and discarded.

As another example of this species of my invention, the liquid from chamber 7 is passed into column 13, being expanded to atmospheric pressure within this column and a temperature of from minus 50° C. at the bottom to minus 100° C. at the top. A considerable proportion of propylene will remain in chamber 18 in solution in the liquid. This liquid is drawn off through pipe connection 18$^a$ and valve 17 into column 15. Column 15 may also be maintained at atmospheric pressure and a suitable temperature gradient maintained by heating the bottom of the column to a temperature of about 0° C. and the top of the column to about minus 50° C. By this proceeding also a quite complete separation occurs, and pure propylene is obtained as gas at valve 34 at the top of the column.

It will be noted from the above that various combinations of temperatures may be used in accordance with the pressures which are maintained. Generally speaking, some advantage is obtained by using pressures higher than atmospheric, because higher temperatures may thereby be employed so that it will not be necessary to employ cooling agents to such an extent. Other combinations of pressures and temperature ranges may be determined in practice in accordance with the principles set forth above.

A compressor indicated at 37 may be interposed in the path of the liquid passing through connection 18ª to column 15, to increase the pressure of the liquid where necessary, and bypass 38 provided with a valve 39 extending around the compressor. Similarly a compressor 40 may be interposed in the path of gases passing through connection 16 from the upper end of column 13 to column 14, for use whenever a higher pressure is required in colmn 14, and bypass connection 41 provided around the compressor.

What I claim is:—

1. The process of producing propylene, comprising, subjecting a liquid containing paraffins with higher olefins and propylene and inert gases held in solution therein to a pressure of from 25 to 35 atmospheres in a vessel the lower end of which is maintained at a temperature of about 80° C. while the upper end is maintained at a temperature of about 10° C., to separate the liquid into a liquid portion and a gaseous portion, passing the liquid portion into another vessel, which is maintained at a pressure between 1 atmosphere and 35 atmospheres, and at a temperature grading from between 0° C. and 80° C. at the bottom to between minus 25° C. and 0° C. at the top, and drawing off propylene in gaseous form from the top of said second vessel.

2. The process of producing propylene, comprising, subjecting a liquid containing paraffins with higher olefins and propylene and inert gases held in solution therein to a pressure of from 25 to 35 atmospheres in a vessel the lower end of which is maintained at a temperature of about 80° C. while the upper end is maintained at a temperature of about 10° C. to separate the liquid into a liquid portion and a gaseous portion, passing the liquid portion into another vessel wherein the pressure is maintained at atmospheric and at a temperature varying from 0° C. at the bottom to about minus 25° C. at the top, and drawing off the propylene in gaseous form at the top.

This specification signed and witnessed this 20th day of September, 1920.

HAROLD F. SAUNDERS.

Witnesses:
J. W. PURCELL,
T. D. VAN SYCKEL.